Figure 9:
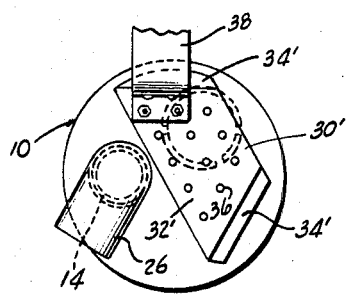

June 4, 1968  R. F. PANNONE  3,386,529
UNIVERSAL MOUNTING SYSTEM FOR MUFFLERS
Filed April 18, 1966  2 Sheets-Sheet 1
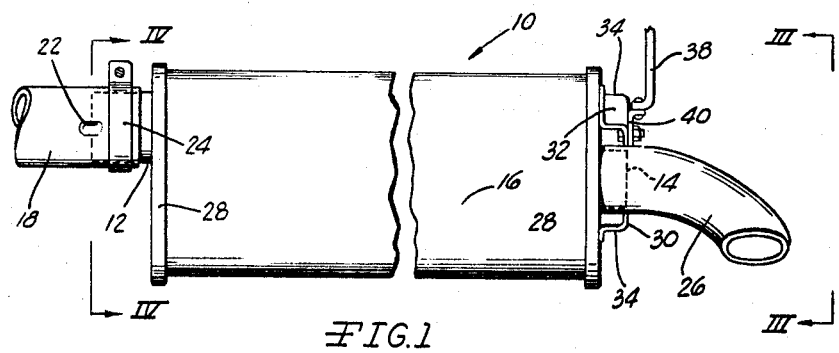
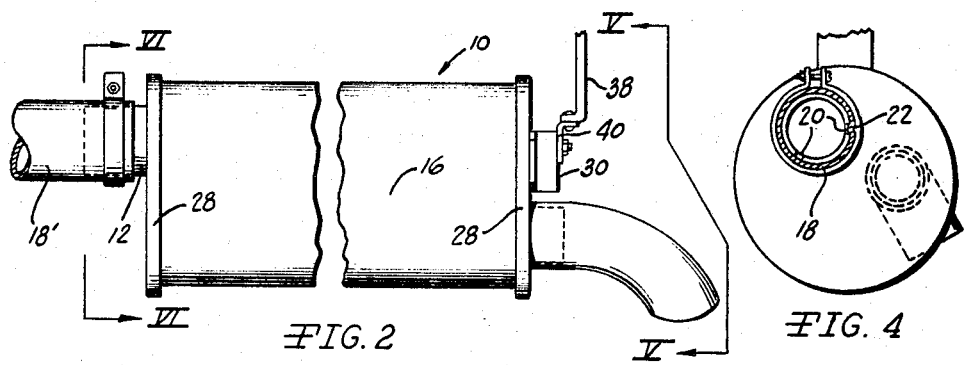
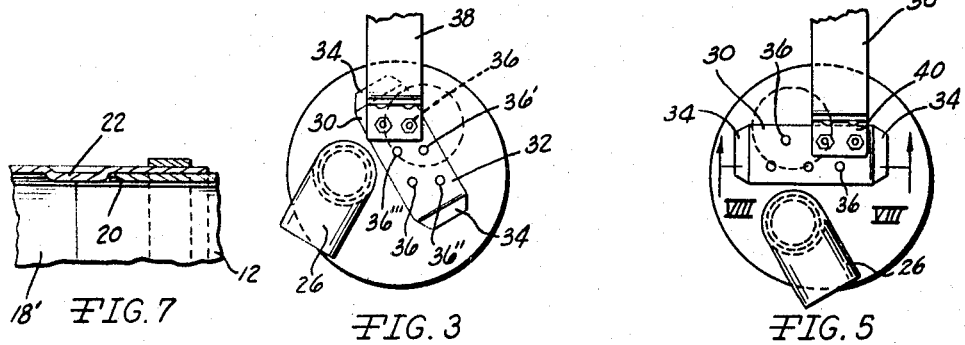
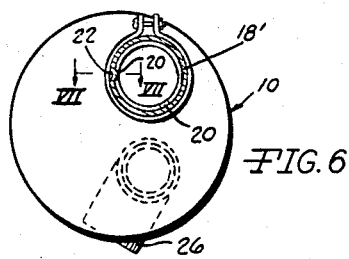
INVENTOR
RICHARD F. PANNONE
ATTORNEYS June 4, 1968 R. F. PANNONE 3,386,529
UNIVERSAL MOUNTING SYSTEM FOR MUFFLERS
Filed April 18, 1966 2 Sheets-Sheet 2

INVENTOR
RICHARD F. PANNONE

BY Beaman & Beaman

ATTORNEYS

United States Patent Office 3,386,529
Patented June 4, 1968

3,386,529
UNIVERSAL MOUNTING SYSTEM FOR MUFFLERS
Richard F. Pannone, Jackson, Mich., assignor to Hayes Industries, Inc., Jackson, Mich., a corporation of Michigan
Filed Apr. 18, 1966, Ser. No. 543,158
4 Claims. (Cl. 181—72)

The present invention relates to improvements in muffler structure for internal combustion engines. More particularly, the invention relates to a universal mounting system for mufflers which is characterized by the cooperative association of the inlet and outlet neck positions with respect to a specific mounting bracket.

In the exhaust system of automotive vehicles it has become relatively commonplace for the component parts of the system to require periodic replacement during the life of the vehicle. The location of the inlet and outlet necks of the muffler, the location of the muffler in the vehicle, the number of mufflers in the system and the supporting bracket structure for the muffler will all vary over a wide range between vehicle makers, models and year of manufacture. As a result, the size of the inventory of the different replacement mufflers which must be carried in order to service the automotive industry by those engaged in the replacement muffler business has become uneconomical and prompt and convenient servicing of exhaust systems of vehicles has become extremely difficult.

As a component part of the original equipment of an automotive vehicle, hanger structure is provided on the chassis from which the original equipment muffler is supported. When the original muffler is replaced in service it is desirable that the original hanger structure be re-usable and that the replacement muffler conform, in all major structural and functional respects, to the original muffler for convenience of installation. To accomplish this, at the present time, it is necessary for concerns engaged in the replacement muffler business to carry an enormous inventory of mufflers in order to service even a single make of automotive vehicle over a few model years.

Thus, an object of the invention is to provide a universal mounting system for mufflers in which the inlet and outlet necks and the bracket structure on the muffler to receive the hanger on the chassis are so coordinated as to enable a single muffler to be used as a replacement for a large variety of original equipment mufflers.

Another object of the invention is to provide a universal mounting system for mufflers in which the inlet and outlet necks and the bracket structure on the muffler to receive the hanger on the chassis are so coordinated as to enable a single muffler to be used as standard equipment and yet meet a relatively wide range of installation conditions.

A further object of the invention is to provide a muffler for automotive vehicles in the form of an elongated chamber having inlet and outlet necks in offset relation to each other and a support bracket attached to the muffler having a series of selectable fastener positions for accommodation to the fastener positions of the chassis hanger.

A still further object of the invention is to provide an exhaust system in which the sound-attenuating chamber of the muffler has locating means on its inlet neck for register with locating means on the exhaust pipe extending from the engine to assure the correct positioning of the chamber with respect to other components of the exhaust system, the locating means being coordinated with a series of selectable fastener positions provided by a bracket adjacent the outlet neck of the chamber.

These and other objects and advantages of the present invention will more fully appear from a consideration of the specification and the appended claims.

Figure 10:
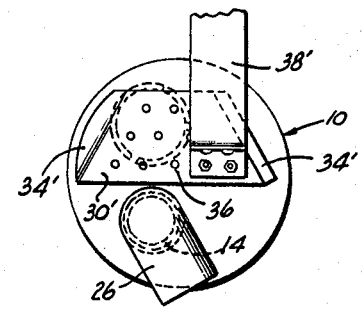
Figure 11:
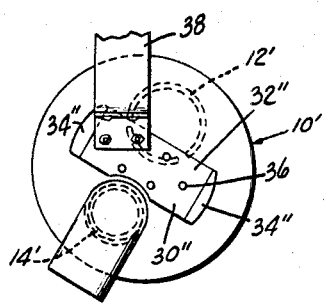
Figure 12:
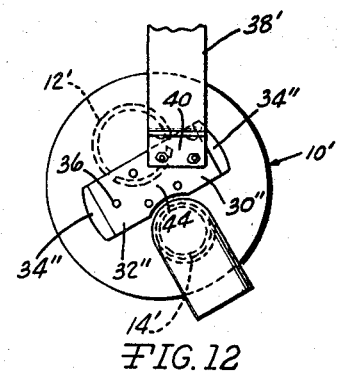
Figure 13:
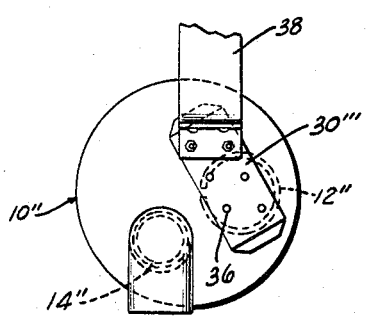
Figure 8:
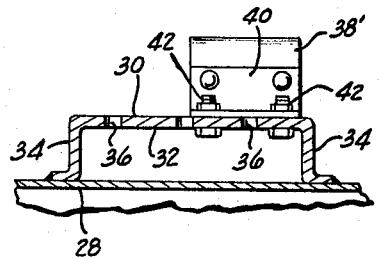

In the drawings,

FIG. 1 is a side elevational view of an exhaust system embodying the present invention, the muffler being shown as the left-hand muffler of a dual muffler system, FIG. 2 is a view similar to FIG. 1 of a muffler of the same construction as FIG. 1 being used as a right-hand muffler of a dual muffler system, FIG. 3 is an end view of FIG. 1 taken from the right end, FIG. 4 is an end view of FIG. 1 taken from the left end, FIG. 5 is an end view of FIG. 2 taken from the right end, FIG. 6 is an end view of FIG. 2 taken from the left end, FIG. 7 is a sectional view taken on line VII—VII of FIG. 6 showing the locating notch structure on the exhaust pipe and inlet neck, FIG. 8 is a sectional view through the mounting bracket taken on line VIII—VIII of FIG. 5, FIGS. 9 and 10 are views similar to FIGS. 3 and 5 of a modified form of mounting bracket, FIGS. 11 and 12 are views similar to FIGS. 3 and 5 of another modified form of mounting bracket, and FIG. 13 is a view similar to FIGS. 3 and 5 of a still further modified form of mounting bracket.

Referring to FIG. 1, the left-hand muffler 10, of a dual muffler installation on a vehicle, has an inlet neck 12 and an outlet neck 14 disposed in offset relation at opposite ends of the silencing chamber 16. Inlet neck 12 telescopes within the exhaust pipe 18 extending to the exhaust manifold of the internal combustion engine. A pair of notches 20, located 120° apart in the inlet neck 12, register with a projection 22 in the pipe 18. A clamp 24 holds the inlet neck 12 and pipe 18 in assembled relation. An outlet neck 14 is shown provided with an angularly disposed tail pipe extension 26.

Rigidly attached to one of the heads 28 of the chamber 16 is a hanger bracket 30 having a flat plate portion 32 with integral, L-shaped legs 34 at opposite ends, the legs being spot welded, or otherwise secured, to the outer surface of the head 28. Plate portion 32 is shown with two rows of holes 36, the rows being parallel to the longitudinal axis of the plate portion 32. The holes 36 of each row are spaced from each other the same distance as the space between the holes 36 of adjacent rows measured along lines diagonal to the longitudinal axis of the plate portion 32. For example, the distance between the holes 36' and 36" of FIG. 3 is equal to the distance between the holes 36' and 36'" of FIG. 3.

A muffler hanger 38 is shown with an inverted L-shaped bracket portion 40 having a pair of holes spaced a distance equal to the spacing between holes 36' and 36" as well as to the spacing between the holes 36' and 36'". Suitable fasteners, such as bolt and nut assemblies 42, secure the brackets 30 and 40 together, the bolts of the assemblies 42 in the muffler of FIG. 1 being received in the diagonal holes of the two rows of holes 36 of the plate portion 32, as shown in FIG. 3..

In FIG. 2, the muffler 10 of FIG. 1 is shown as installed as the right-hand muffler of a dual muffler installation, the inlet 12 telescoping with the pipe 18' which has a projection 22 diametrically opposite the projection 22 in pipe 18 of FIG. 1 with which the notch 20 registers. Thus, the muffler 10 of FIG. 2 has been rotated 60° about the longitudinal axis in an anti-clockwise direction from the position of FIG. 1 in order to effect register between the projection 22 and one of the notches 20.

With the muffler 10 of FIG. 2 in the position just described, the plate portion 32 of bracket 30 has its longitudinal axis horizontally disposed, as shown in FIG. 5, with the tail pipe extension 20 being directed downwardly and to the right. In this position the pair of holes in the hanger 38' is aligned with a pair of holes 36 of the same row of holes in contrast to the alignment with diagonal holes in the adjacent rows, as disclosed in FIG. 3.

It will be understood that in the installation of FIG. 1 any one of the three sets of diagonal holes in the adjacent rows of holes 36 may be selected in the attachment of the brackets 30 and 40, as best seen in FIG. 3. Likewise, in the installation of FIG. 2, either one of the two sets of adjacent holes in either of the two rows of holes 36 may be aligned with the pair of holes in the bracket 40 of hanger 38'.

FIGS. 9 and 10 correspond to FIGS. 3 and 5 and disclose a slightly modified form of hanger bracket 30' with a plate portion 32' having integral L-shaped legs 34'. Holes 36 are arranged in three rows parallel to the longitudinal axis of the plate portion 32' with the holes of adjacent rows diagonally disposed and spaced from each other the same distance as the holes of the same parallel row. The bolt and nut assemblies 42 secure the hangers 38 and 38' to the brackets 30' in the same manner as described with respect to FIGS. 3 and 5.

In FIGS. 11 and 12 the muffler 10' has an inlet neck 12' and an outlet neck 14' in diametrically opposed relation in contrast to the arrangement shown in FIGS. 3 and 5. The bracket plate portion 32' is the same as the bracket plate portion 32' of FIGS. 3 and 5 except for the arrangement of the holes 36 with respect to the longitudinal axis of the bracket. As shown in FIGS. 11 and 12, the adjacent holes 36 of plate portion 32' are all spaced the same distance from each other as the holes in the bracket 40 with the exception of the diagonal spacing of the four holes equally spaced about the center point 44 of the plate portion 32". It will be noted that the longitudinal axis of the plate portion 32" is normal to a plane through the longitudinal axes of the inlet and outlet necks 12' and 14'.

FIG. 13 is similar to FIG. 3 and shows the muffler 10" with the inlet neck 12" and outlet neck 14" in different relative positions than shown in FIGS. 3 and 11. The bracket 30''' may be identical to the bracket 30 of FIG. 3. As shown, the longitudinal axis of the bracket 30''' is normal to a plane through the longiutdinal axes of the inlet and outlet necks 12" and 14" and with the longitudinal axis of the inlet neck 12" intersecting the longitudinal axis of the bracket 30'''.

As an example of the universal nature of the mounting system for mufflers for passenger vehicles, it is possible with two mufflers with special positioning of the inlet and outlet necks in relation to a bracket, embodying the present invention and mounted on the rear head of the mufflers, to fit the following Ford passenger vehicles, the mufflers being 6" round, 26" to 27½" shell and 2" I.D. inlet neck and mounted behind the rear axle:

Ford—1960–63 all single, RH and LH duals.
Ford—1964 all RH and LH dual, all single six cylinder and V-8 with 2" I.D. inlet.
Edsel—1960 all single, RH and LH dual.
Fairlane—1963–64 V-8 station wagon with 289 c.u. in. engine.
Mercury—1961–62 all single, RH and LH dual; 1963–64 all RH and LH dual.

In contrast to the above example, wherein two mufflers embodying the principles of the present invention are capable of being adapted to all the models of Ford automobiles listed above, in actual practice fifty-one different mufflers were used to equip the listed automobiles as standard equipment and fourteen different service mufflers are required.

Having thus described my invention, what I claim is new and desire to protect by Letters Patent, is:

1. In an exhaust system for internal combustion engines of vehicles having an exhaust pipe leading from the engine and a hanger having a pair of openings for receiving a pair of fasteners for supporting the outer end of the exhaust system from the vehicle chassis, a muffler in the form of an elongated chamber having an inlet neck at one end for attachment to said exhaust pipe and an outlet neck at the other end having an extension for exhausting gases from the system in a direction angularly disposed to the longtiudinal axis of said chamber, said necks being in offset relation to each other, a bracket attached to said other end of said chamber and disposed to one side of said outlet neck, said bracket having a series of pairs of selectable fastener openings for alignment with the pair of openings of said hanger to permit said chamber to be attached to said hanger with said chamber in different angular positions.

2. In an exhaust system for internal combustion engines of vehicles, the combination with an elongated muffler mounted rearwardly of the rear axle of the vehicle, said muffler having heads at opposite ends carrying inlet and outlet necks in offset relation to each other, a bracket attached to one of said heads to one side of its associated outlet neck, said bracket having a plate portion with a plurality of holes defined therein to receive muffler hanger fastener means, certain pairs of adjacent said holes being equally spaced, certain of said pairs of holes being located along axes angularly disposed to each other, of a vehicle supported hanger having a bracket plate portion with a pair of holes spaced to register with any one of said pair of holes whereby said fastener means may be received in said registered holes of said plate portions to selectively support said muffler in different angular positions about its longitudinal axis.

3. In an exhaust system for internal combustion engines of vehicles, the combination set forth in claim 2 wherein said inlet neck on said other head has means for registering with a position of attachment of said inlet neck in said exhaust system, said last means and said pairs of holes being retained in fixed angular relation to each other with respect to said longitudinal axes of said muffler.

4. A muffler for the exhaust system of internal combustion engines of vehicles, said muffler being elongated and having heads at opposite ends, inlet and outlet necks on said heads, a bracket on the head with the outlet neck and located to one side of said outlet neck, said bracket having a plurality of holes defined therein to receive muffler hanger fastener means, certain pairs of adjacent said holes being equally spaced, certain of said pairs of holes being located on axes angularly disposed to each other.

References Cited

UNITED STATES PATENTS

| | | | |
|---|---|---|---|
| 1,629,745 | 5/1927 | Shaw | 248—274 XR |
| 2,730,320 | 1/1956 | Srader | 248—16 |
| 2,744,706 | 5/1956 | Gerdy | 181—36 |
| 3,181,825 | 5/1965 | Jackoboice | 248—16 |

FOREIGN PATENTS

| | | |
|---|---|---|
| 152,303 | 11/1955 | Sweden. |
| 153,520 | 6/1932 | Switzerland. |

ROBERT S. WARD, JR., *Primary Examiner.*